United States Patent [19]

Yezek et al.

[11] 4,285,977

[45] Aug. 25, 1981

[54] PROCESS FOR PREPARING CARBONATED LIQUIDS

[75] Inventors: Milton Yezek, Clover, S.C.; Joan M. Adams, Fairview, N.J.

[73] Assignee: General Foods Corporation, White Plains, N.Y.

[21] Appl. No.: 83,734

[22] Filed: Oct. 10, 1979

[51] Int. Cl.$^3$ .............................. A23L 2/00; A23L 2/40
[52] U.S. Cl. .......................................... 426/67; 62/48; 62/121; 426/477; 426/561; 426/590
[58] Field of Search ................ 426/67, 119, 115, 120, 426/561, 590, 591, 395, 477, 397, 524; 261/121 R, DIG. 7; 62/1, 10, 48, 62, 69, 121, 371, 372; 206/219, 221, 524.1; 99/323.1, 323.2, 275, 279; 423/437

[56] References Cited

U.S. PATENT DOCUMENTS

| | | |
|---|---|---|
| 1,907,301 | 5/1933 | Martin .............................. 426/477 X |
| 2,073,273 | 3/1937 | Wetstein .......................... 426/477 X |
| 2,447,716 | 8/1948 | Rowe ................................ 426/477 X |
| 2,575,509 | 11/1951 | Bayston ................................ 426/67 |
| 2,603,569 | 7/1952 | Alther et al. . |
| 2,742,363 | 4/1956 | Hughes . |
| 2,851,359 | 9/1958 | Diller . |
| 2,953,459 | 9/1960 | Diller . |
| 2,975,603 | 3/1961 | Barnes et al. ........................ 426/67 X |
| 3,039,644 | 6/1962 | Lefcort ............................... 426/119 X |
| 3,220,204 | 11/1965 | Adler et al. ................................... 62/1 |
| 3,241,977 | 3/1966 | Mitchell et al. . |
| 3,255,600 | 6/1966 | Mitchell et al. . |
| 3,441,417 | 4/1969 | Feldman et al. . |
| 3,476,520 | 11/1969 | Hovey . |
| 3,667,962 | 6/1972 | Fritzberg et al. . |
| 3,888,998 | 6/1975 | Sampson et al. . |
| 4,007,134 | 2/1977 | Liepa et al. . |

OTHER PUBLICATIONS

Woodrof et al. Beverage: *Carbonated and Noncarbonated*, 1974, pp. 179, 188 and 189.

*Primary Examiner*—Arthur L. Corbin
*Attorney, Agent, or Firm*—Daniel J. Donovan; Bruno P. Struzzi

[57] ABSTRACT

A process for the preparation of carbonated beverages by the consumer is disclosed. Water is contacted with carbonated ice and, optionally, flavored syrup in a closed pressure vessel whereby superatmospheric pressure is created and a carbonated liquid is produced. Soft drinks prepared by this method have a degree of carbonation substantially the same as the bottled or canned product available commercially.

8 Claims, No Drawings

PROCESS FOR PREPARING CARBONATED LIQUIDS

BACKGROUND OF THE INVENTION

1. Field of the Invention

This invention relates to carbonated beverages. More particularly, it relates to consumer or "at home" preparation of carbonated beverages having substantially the same palatability and effervescense of bottled or canned carbonated beverages. This invention especially relates to the preparation of carbonated beverages from carbonated ice.

2. Description of the Prior Art

Attempts to commercialize point of consumption or at home preparation of carbonated beverages have not met with any lasting success over the years. The principal shortcoming of the several techniques has been that the consumer-prepared carbonated beverage has been significantly inferior in one or more aspects to the bottled or canned carbonated beverages available in stores and supermarkets. The most common complaints leveled at the carbonated beverage prepared by the consumer is that the quality and the quantity of the carbonation, the bubble size and the duration of the effervescence does not compare favorably with the commercially-available bottled carbonated beverage.

On the other hand, there are significant advantages to consumer preparation of carbonated beverages vis-a-vis packaged liquid carbonated beverages. Thus, the use of glass, metal or other bulky containers is avoided, the necessity of bottling, shipping and storing carbonated beverages consisting of a major percentage of water is eliminated and the utility in terms of portability by the user is greatly enhanced. Further, disposable and returnable cans and bottles would no loner be of major concern to environmentalists who have been seeking ways to conserve both the country's natural resources and natural beauty.

U.S. Pat. No. 2,073,273 to Wetstein discloses a means to prepare a carbonated beverage wherein water plus sweetener and a flavor is placed in a small pressure vessel and a metal cartridge containing carbon dioxide is inserted into the sealed vessel where movement of the cartridge causes a piercing of the cartridge thereby injecting the carbon dioxide into the water to form the carbonted beverage. The carbon dioxide also pressurizes the vapor space above the liquid causing the carbonated beverage to pass out of the vessel through a serving nozzle when an external valve is opened. This device met with some measure of success in preparing unflavored and unsweetened carbonated water for home use.

The prior art includes a significant number of dry compositions for use in preparing carbonated beverages at home. In most of these a source of carbonate and acid, known in the art as a chemical "couple", are combined with sweeteners and a source of flavor so that upon addition of the composition to a glass of water, the "couple" reacts to yield carbon dioxide and at least some measure of carbonation to the beverage. U.S. Pat. No. 2,603,569 to Alther discloses the carbonation of a citric acid-sucrose complex with a sodium bicarbonate-sucrose complex. U.S. Pat. No. 2,742,363 to Hughes claims a combination of an alkali metal bicarbonate and a sulfonic acid ion exchange resin in its hydrogen form. In U.S. Pat. Nos. 2,851,359 and 2,953,459 to Diller a highly soluble phosphate and a slowly soluble phosphate are combined with an alkali metal or ammonium carbonate or bicarbonate to prolong the ebullition of the beverage. U.S. Pat. No. 3,241,977 to Mitchell et al. discloses chemical carbonation with citric, adipic or tartaric acid in finely divided form and which is said to approximate the carbonation sensation of cola-type beverages sold in air-tight bottles or cans which are produced by a saturated solution containing several volumes of carbon dioxide. U.S. Pat. No. 3,441,417 to Feldman et al. discloses a dry beverage composition adapted to be reconstituted with water to an effervescent beverage which includes an essential carbonating ingredient, an organic compound having a carbonic acid anhydride group, capable of controlled hydrolysis in water to release carbon dioxide at a substantially uniform rate. U.S. Pat. No. 3,667,962 to Fritzberg et al. discloses a carbonation composition utilizing two distinct bodies formed from an aqueous solution of a saccharide; one contains an edible food acid and the other an edible bicarbonate. Upon addition to water the two tablets dissolve quickly and react to evolve carbon dioxide.

Many of the dry powder chemical couples have a common and acknowledged defect, an unpleasant taste in the beverage directly resulting from the components of the powder. U.S. Pat. No. 2,742,363 to Hughes and U.S. Pat. No. 3,476,520 to Hovey addressed this problem by placing the chemicals in a container which is pervious to gas and water but impervious to solid reactants and by-products. U.S. Pat. No. 2,975,603 to Barnes et al. takes another approach by utilizing carbonated ice containing at least 25 milliliters of carbon dioxide per gram of ice as the source of carbonation. U.S. Pat. Nos. 3,888,998 to Sampson et al., 3,992,493 and 4,025,655 to Whyte et al. and 4,007,134, 4,110,255 and 4,147,808 to Liepa et al. disclose carbonation methods, compositions and devices whereby carbon dioxide containing molecular sieves are used to carbonate aqueous solutions.

Despite the many attempts to develop a means or system to prepare carbonated beverages in the home, none have succeeded in producing a carbonated product equal in all respects to the flavor, taste and appearance, as well as the quality and quantity of carbonation, of the commercially packaged, liquid carbonated beverages available in consumer-oriented stores and supermarkets.

Thus, it is an object of this invention to provide a simple efficient process for point of consumption preparation of carbonated beverages having carbonation quality and quantity, as well as flavor, taste and appearance, equal to that of commercially available packaged liquid carbonated beverages.

SUMMARY OF THE INVENTION

In accordance with the present invention, it has been found that carbonated water and/or beverages of superior quality are produced by contacting water with carbon dioxide hydrate (carbonated ice) in a closed pressure vessel. More particularly, this invention is directed to a method of carbonating water which comprises contacting water with carbonated ice initially at substantially normal atmospheric pressure in a close pressure vessel, the amount of carbonated ice being sufficient to create a super-atmospheric pressure in said vessel and provide carbonated water containing at least two volumes of carbon dioxide.

By utilizing the process of this invention, i.e., preparing carbonated beverages in a closed vessel by immersing carbonated ice in an aqueous fluid, a carbonated product is produced which unexpectedly had a higher degree of carbonation than carbonated beverages prepared in a pressure vessel from carbonated ice which was not immersed in the liquid or from dry ice, whether immersed in the liquid or not.

DESCRIPTION OF THE PREFERRED EMBODIMENTS

In accordance with the practice of this invention, water and carbonated ice are introduced into any suitable apparatus capable of withstanding the temperatures and pressures necessary for the proper formation of a carbonated liquid product. Preferably, the apparatus is so constructed that the carbonated ice is located out of contact with the water but yet can easily and readily be brought into contact with the water when carbonation of the water is desired. The apparatus, if not closed to the atmosphere, is placed in that condition after the carbonated ice and water are placed inside and then the water and ice are brought into contact for sufficient time to produce carbonated water. The quantity of carbonated ice employed must be sufficient to create a superatmospheric pressure and to yield a carbonated water containing at least 2 volumes of carbonation. Ideally, this invention may be readily practiced in the home or at the point of consumption.

As used herein, the terms volume of carbonation, volume of $CO_2$ in a carbonated liquid or similar language shall mean the gaseous volume of $CO_2$ at standard temperature and pressure (15° C. (59° F.) and 1 atmosphere) contained in a volume of liquid.

Carbonated ice is a frozen water and carbon dioxide-hydrate which, upon contact with an aqueous medium, releases carbon dioxide. The exact mechanism of carbonating a beverage is not understood but the carbonated ice produces higher volumes of carbonation in a unit time than is observed when carbonating using pure gaseous liquid or solid carbon dioxide. Perhaps the hydrate in liquid form mixes with the beverage and disperses therein rather than forming a gas and then being dissolved. The term carbonated ice refers to frozen carbon-dioxide water hydrate in which the carbon dioxide is present in an amount varying from about 10 to about 118 milliliters of $CO_2$ per gram of ice.

The carbonated ice which may usefully be employed in practicing this invention may be prepared by any of a number of known procedures. While carbonated ice containing as little as 10 ml. of gas per gram of ice may be employed, a volume of at least about 25 ml of $CO_2$ per gram of ice is the usual starting material with a range of about 35 to about 90 ml./g. being particularly preferred. This product, as well as a method of preparing it are described in U.S. Pat. Nos. 2,975,603 and 3,086,370 to Barnes et al. and 3,217,503 to Mitchell et al. The detailed description of the formation of the carbonated ice product contained in each of these patents is incorporated herein by reference and is briefly described hereinbelow.

In forming the carbonated ice product, the temperature during the reaction should be maintained (a) above the freezing point of the aqueous liquid under the prevailing pressure and, preferably, (b) below the gasified ice-freezing temperature range. This will give an operable temperature range of approximately 0° C. to about 14° C. where pure water is used. The mixture of water and carbon dioxide must be maintained under pressure during the reaction period. In order to have the carbon dioxide content at a level of at least 25 milliliters per gram of ice, the pressure should be maintained above 200 psig and can be as high as about 500 to 600 psig. The amount of carbon dioxide bound in the ice can be as much as 118 milliliters per gram of ice without destroying the stability characteristics of the product under normal refrigerated storage conditions, i.e., at about −10° C. at atmospheric pressure.

The carbonated ice prepared in this fashion resembles ordinary ice and is free of liquid. This ice product has a freezing point substantially above 0° C., i.e., it may be as high as 14° C. or more. Most commonly it is about 4° to 8° C. A characteristic feature of this gasified ice product is its ability to release carbon dioxide at a controllable rate when melted, as when added to an aqueous liquid. The carbonated ice so prepared has a density in the order of 0.94–0.99 g. per cc. or higher, which is slightly higher than ordinary ice which has a density of about 0.92 g. per cc. When this product is prepared at elevated pressures, it is often preferred that it be degassed or stabilized for about 24 hours at about minus 10° C. During this period, any carbon dioxide which may be held loosely within the product is evolved and any liquid carbon dioxide, which may be within the mass, generally volatilizes and passes off from the product. The stability of this product is good below 0° C. Its initial stability is favorable in that any carbon dioxide which is not securely locked within the ice matrix is readily liberated during the degassing or stabilizing period without danger of explosion or product deterioration. After this degassing, the stabilized product has a shelf life of at least 30 days and usually substantially longer, when the carbonated ice is maintained under controlled conditions of temperature. It is stable for an extended period under normal freezing conditions in a household freezer, i.e., at about minus 10° C.

The carbonated ice so prepared contains at least about 25 ml. of $CO_2$ per gram of ice which is roughly equivalent to 25 volumes of gas per volume of ice. Although this prior art procedure can produce carbonated ice containing ratios of gas to solid as high as about 100–115, a preferred product is one conveniently prepared at 300–400 psig which is characterized by its high stability and a ratio of 50–90 ml. of $CO_2$ per gram of ice.

Another procedure which may be employed to prepare carbonated ice for use in this invention is disclosed in U.S. Pat. No. 3,255,600 to Mitchell et al. The detailed description set forth in this patent is incorporated herein by reference and is briefly described here. In this disclosed procedure, water and liquid carbon dioxide are introduced into a closed reaction vessel, preferably provided with a vapor head space. The two liquids are mixed to uniformly disperse the liquid carbon dioxide in the water. By providing an excess of liquid carbon dioxide in the reaction vessel and permitting a controlled isenthalpic expansion of the vapor in the head space above the mixture, part of the carbon dioxide will vaporize with the heat of vaporization being sufficient to freeze the mixture to yield a carbonated ice. The product produced in this fashion is in the form of a snow of carbonated ice. The temperature and pressure of this system tend to assume values of approximately 11° C. and 655 psig, respectively, under proper agitation and if the heat removal is not excessively high. Rapid venting of carbon dioxide from the reactor produces rapid cooling rates which freezes the carbonated ice so rapidly that it does not have the opportunity to entrap the maximum amount of carbon dioxide. Thus, carbonated ice can be produced by this process having carbon dioxide contents of from 25 to 118 ml. per gram of ice.

The release of carbon dioxide upon the melting of the carbonated ice prepared as described above is not always at a uniform rate, particularly where the carbon dioxide content is at the lower end of the range. U.S. Pat. No. 3,333,969 to Mitchell et al discloses a process of preparing a carbonated ice product capable of releasing carbon dioxide at a high level and in a continuous and controlled manner. This is achieved by subdividing carbonated ice prepared by the above processes into discrete particles while maintaining the temperature of the ice below 0° C. and then forming these particles into a compacted, adherent mass or briquette by applying mechanical pressure of between 10 and 10,000 psig to the discrete particles. Water may be coated onto the outer surface of the briquette. In this fashion, the outer coating will have dissolved in the drink by the time the carbon dioxide level in the water is sufficient to produce a carbonated water.

In practicing the present invention, any form of carbonated ice described above may be employed. Controlled-sized units of the carbon dioxide, whether rod or briquette, are useful. Although the prior art patents referred to above collectively disclose carbonated ice having carbon dioxide contents from about 10 to about 118, preferably about 85 to 90, milliliters of $CO_2$ per gram of ice, the carbonated ice used in practicing this invention which is particularly preferred contains about 40 to about 90 milliliters of $CO_2$ per gram of ice.

When preparing carbonated soft drinks according to this invention, it is preferred that the color, flavoring and sweeteners be combined in a syrup or a dry mix and added, along with the water, to the beverage preparation apparatus.

The water employed to prepare carbonated beverages according to this invention may be any type of drinking water available to the user. If cold water is employed, the carbonated ice will not melt quickly and thus the time to prepare the carbonated liquid will be prolonged. It is therefore preferred that the water be at about 50° F. or above to carbonate the liquid in a reasonable period. If desired, ice can be added with the carbonated ice so that a cold carbonated liquid can be prepared in a short period.

The quantities of water and carbonated ice required to prepare carbonated liquids according to this invention are variable, depending on such factors as the degree of carbonation desired, the carbon dioxide content of the carbonated ice, the nature of the syrup or dry mix employed and the head space available in the preparation apparatus. Generally, the apparatus have a head space which comprises up to about 50 volume percent of the total internal volume or, more particularly, should have an available head space or free vapor space of up to about 40 volume percent, preferably 5–30 volume percent, and the amount and quality of the carbonated ice should be sufficient to produce a pressure of about 10–120 psig in the apparatus and a carbonation volume of at least 2, preferably at least 3, at the completion of the carbonation process.

The invention may be used to provide a supply of carbonated water similar to "club soda". In one of its preferred embodiments, the user may employ this invention to prepare a variety of carbonated beverages. As explained above, coloring, flavoring and sweetener may be added directly to the preparation apparatus. The coloring, flavoring and sweetener can conveniently be provided in syrup form, available commercially, or in a dry mix, also available commercially. In this fashion, such familiar beverages as carbonated cola, carbonated root beer, carbonated lemon-lime soda, carbonated cream soda, etc. can be prepared at home. Only the ingenuity of the user, the availability of flavored syrup or dry mix and the individual tastes of the consumers limit the variety of carbonated beverages which may be prepared by the process of this invention.

An apparatus is needed to carry out the process of this invention. In general, it must meet certain minimum design criteria. It must be capable of withstanding the temperatures and pressures which are generated in a confined space during the preparation of the carbonated beverage from carbonated ice and water. Temperatures of about 35° to 70° F. and pressures of about 10 to 120 psig are developed within the apparatus while practicing this invention. The apparatus must also be provided with means to introduce water and carbonated ice, and, optionally, color, flavor and/or sweetener additives into the apparatus, as well as a means to remove or dispense the carbonated beverage from the apparatus after it is prepared. Ideally, the apparatus should be small, light in weight and portable to facilitate use in a variety of locations remote from the home. Such features are not necessary where the use of the apparatus is limited to the user's home but are desirable features even here so as to eliminate the need for the individual consumer to obtain a number of these devices. The size of the apparatus is not critical but for convenience it should be available in a variety of sizes, so as to be able to prepare from 1 glass to 2 liters or more of carbonated beverage. In addition, the apparatus must be designed so that it can easily be used by a school child or an adult. In addition to providing means for the introduction of carbonated ice into the apparatus, it must be designed so that when the carbonated ice is placed into the apparatus it does not contact the water therein until the interior of the apparatus is closed to the atmosphere and the user desires that they may be brought together to carbonate the water.

One apparatus which may be used for the process of this invention constitutes a rigid receptacle in the shape of a wide-mouthed bottle to which a cover or cap can be affixed to produce a closed pressure vessel. To facilitate the separation of the carbonated ice and the water a perforated basket is mounted on the underside of the cover extending into the top of the receptacle when the cover is affixed to the receptacle. The basket must be sized to hold sufficient carbonated ice to carbonate the liquid capacity of the receptacle. It may be easily removable from and attachable to the cover to facilitate loading the carbonated ice into the perforated basket. To insure that the ice and liquid do not contact each other when the assembled apparatus is in an upright position, the cover can have a domed configuration so that the perforated basket is located above the point where the receptacle and the domed lid are joined. Contact between the liquid and the ice cannot be effected in this configuration with the apparatus in an upright position since the maximum height of the liquid level is below the bottom of the perforated basket. This design offers another advantage in that a vapor head space is always provided. A spring-loaded, manually-operated valve provided in the cover permits venting of the $CO_2$ pressure from the vapor space. In this fashion the cover may easily be removed and replaced by a storage cap and the carbonated liquid consumed.

In another embodiment utilizing a domed cover, a hinged perforated plate is provided instead of a perforated basket. In this design the hinged, perforated plate is located at the open end of the cover, extending across and partitioning off the inside of the cover. The plate is swung out of position, carbonated ice is loaded into the inside of the cover, the plate is placed back into position and retained there by fastening means provided for that purpose. The perforated cover retains the carbonated ice in the domed cover separating it from the water in the lower portion of the apparatus but permitting contact between the water and the carbonated ice when the apparatus is placed in an inverted position.

In yet another embodiment, a perforated basket which extends into the receptacle is provided for holding the carbonated ice. The basket may be either mounted on the underside of the cover extending into the top of the receptacle when the cover is affixed thereto or removably mounted in the mouth of the receptacle. In either configuration the lower portion of the basket extends below the surface of the water in the receptacle so that the carbonated ice will contact the water when the basket is loaded with carbonated ice. When the cover is attached to the receptacle and the assembled apparatus is inverted, the perforated basket will retain the carbonated ice beneath the surface of the water to obtain maximum contact between the water and the carbonated ice. If the carbonated ice is not immersed, the carbonated ice will slowly melt and carbonate the water, but, of course, the time required is substantially longer than if the apparatus were inverted.

In a preferred embodiment similar to the previous configuration, the domed cover is provided with a plate extending across the open end of the cover and partitioning off the internal area of the cover. This plate is composed of a flexible material and is provided with a series of flaps which may be pushed aside when placing carbonated ice in the cover but which return to their original position so as to retain the carbonated ice within the cover. The flaps also provide sufficient openings to permit the passage of liquid into the domed cover when the assembled apparatus is in the inverted position.

A carbonated beverage can be prepared in such apparatus as follows:

The domed lid is removed from the liquid receptacle by unscrewing the lid or unfastening the latching arms holding the lid to the receptacle. A quantity of tap water is placed in the receptacle. Optionally, a flavored syrup containing coloring, flavoring and sweetener are admixed with the water in the receptacle. The perforated basket is removed from the inside of the domed lid, the required amount of carbonated ice is placed in the basket and it is reaffixed to the inside of the lid. Where a perforated plate is used instead of a perforated basket, the plate is swung out of position, the carbonated ice is placed inside the domed top and the plate is then fastened in position. Similarly, where a flexible plate is provided, the carbonated ice is pushed past the flexible flaps and is retained in the domed cover. The domed lid is placed on the top of the wide-mouthed receptacle and fastened thereto by the means provided. The water and the carbonated ice are brought together by the simple expedient of inverting the assembled pressure vessel. Following a sufficient period of time for the carbonated ice to melt in the water, viz., 10-20 minutes, the apparatus is returned to its original upright position. Since excess carbon dioxide has collected in the vapor space to pressurize the vessel, this pressure is relieved by depressing the vent valve. The cover may then be removed to dispense the carbonated beverage into serving glasses or capped.

The following examples will serve to illustrate the process of this invention.

EXAMPLE 1

A liter of 50° F. tap water was placed in the lower portion of the carbonation apparatus as described above. This apparatus had an internal volume of 1207 cc. A briquitte of carbonated ice weighing 115 grams and containing about 45 ml. of $CO_2$/gram of ice was placed in the portion of the cover provided for the carbonated ice. The cover was then screwed onto the lower portion of the apparatus and the assembled apparatus was placed in an inverted position so as to contact the water and the carbonated ice. At the end of 15 minutes, the apparatus was inverted, the $CO_2$ pressure in the vapor space was released through the venting valve and the cover was removed. The water in the lower portion of the apparatus was poured out. The carbonated water was at a temperature of about 40° F. It had the resemblance of club soda with small to medium bubbles and contained 3.0 volumes of carbonation. In a similar fashion, carbonated soft drinks were prepared by adding a quantity of syrup to the lower portion of the apparatus along with the tap water. By employing an appropriate syrup, carbonated beverages of cola, lemon-lime and root beer were prepared. The carbonation level of each was 3.0–3.5 volumes. If desired, water ice may be added to the tap water in the lower portion of the apparatus.

EXAMPLE 2

A briquette having substantially the same properties as that of Example 1 was dropped into a glass of tap water. A vigorous evolution of gas was observed. At the end of 15 minutes, most of the briquette had melted producing a glass of carbonated water which visually resembled club soda but it contained less than 2 volumes of carbonation.

It would appear that the superatmospheric pressure developed in the carbonation apparatus employed in Example 1 produces a higher volume of carbonation than is achieved by carbonating water with carbonated ice at atmospheric pressure.

EXAMPLE 3

Three different flavored beverages, carbonated by a variety of methods, were evaluated by a group of five trained profile panelists. These panelists were trained to evaluate the flavor and the carbonation attributes of carbonated beverages. The beverages evaluated were cola flavored, citrus flavored and root beer flavored. Three types of carbonation were evaluated for each flavored beverage—bottled beverage, carbonation by carbonated ice and bottled club soda plus flavored syrup.

The beverages were prepared as follows:

*bottled beverage:* refrigerated to 40° F.

*carbonated ice:* 115 grams of carbonated ice in briquette form, containing 50 milliliters of $CO_2$ per gram of ice, were combined with 673 ml. of 50° F. tap water and 158 ml. of refrigerated commercial syrup (cola, citrus or root beer flavored) in a closed beverage preparation apparatus such as that described hereinabove. The apparatus was inverted for 10-20 minutes to prepare the carbonated soft drink.

*club soda plus syrup:* a 28 oz. bottle of commercial club soda, which contained no added salt, was chilled to 40° F. The bottle was opened, 138 ml. of club soda were removed and 138 ml. of refrigerated commercial syrup were added. The contents of the bottle were gently mixed by turning the bottle.

Each of the beverages (3 flavors, 3 carbonation types) was independently evaluated by each of the five panelists as coded samples one at a time. The serving temperature of each beverage was 45° F. A small portion of each beverage was placed in a glass and each panelist sampled a sip of the beverage and made an independent evaluation of the sensory mouthfeel characteristics relating to the carbonation of each beverage. The following characteristics were evaluated:

*Prickly*—Tongue feeling that ranges from a brief tingle through a brief harsh impression to a longer lasting warm impression.

*Bubble amount*—Sensory perception of the number of bubbles in the mouth.

*Bubble size*—Sensory perception of the magnitude of the bubbles.

*Foaminess*—Sensory perception of froth in the mouth.

*Total carbonation mouthful*—Total impression of effervescence in the mouth, based on prickliness, amount of bubbles, size of bubbles and foaminess.

Each of the panelists assigned a numerical value indicating the relative intensity of each of the above characteristics (except bubble size which was classified as small, medium or large). The intensity scale employed ranged from 0 to 13 on the following basis:

0 = none
1 = barely perceptible
3 = barely perceptible to slight
5 = slight
7 = slight to moderate
9 = moderate
11 = moderate to high
13 = high Obviously, even numbers indicated an intensity between the description for the odd numbers.

The carbonation of each beverage was evaluated by the Terriss cup method and reported as "$CO_2$ volume".

The Terriss cup method for determining the carbonation level of carbonated beverages is a standard laboratory test used throughout the soft drink industry. The test is conducted in a standard glass cup known as a Terriss cup, manufactured by Terriss Consolidated Industries, Asbury Park, New Jersey. This cup is assembled by connecting its two halves by means of a threaded joint provided for this purpose. The assembled cup is provided with a thermometer and a pressure gauge. To measure the carbonation level of a beverage, the measuring equipment must first be brought to a standard temperature. To do this, a mixture of ice and water is placed in the lower half of the Terriss cup, the two halves are screwed together and the assembled cup is shaken until a temperature of 35° F. is attained. The Terriss cup is disassembled and a standard measured quantity of the carbonated beverage is placed in the lower half of the Terriss cup. The two halves are screwed together and the assembled cup is shaken until the pressure inside the cup reaches a maximum value. This pressure and the temperature are recorded. From the readings taken and the known values of the internal volume of the Terriss cup and the initial temperature and pressure, the carbonation level of the beverage under test is obtained by standardized routine calculation and reported as the gaseous volumes of $CO_2$ at STP contained in a volume of carbonated beverage.

The results are presented in Tables I-III below.

TABLE I

| CITRUS FLAVORED CARBONATED BEVERAGE | | | |
|---|---|---|---|
| Carbonation Notes | Bottled | Carbonated Ice | Club Soda + Citrus Syrup |
| Prickly | 10 | 8 | 11 |
| Bubble amount | 9 | 7 | 9 |
| Bubble size | small–med | small–med | small–med |
| Foamy | 1 | 5 | 3 |
| Total carbonation mouthfeel | 9 | 8 | 9 |
| $CO_2$ volume | 3.4 | 3.0 | 3.2 |

Conclusions:
1. Carbonated ice - different character, similar intensity to bottled.
2. Bottled and club soda citrus carbonated beverage similar to each other.

TABLE II

| ROOT BEER FLAVORED CARBONATED BEVERAGE | | | |
|---|---|---|---|
| Carbonation Notes | Bottled | Carbonated Ice | Club Soda + Root Beer Syrup |
| Prickly | 7 | 9 | 8 |
| Bubble size | 7 | 9 | 9 |
| Bubble amount | small–med | med–large | medium |
| Foamy | 1 | 9 | 5 |
| Total carbonation mouthfeel | 7 | 10 | 9 |
| $CO_2$ volume | 3.6 | 3.1 | 3.0 |

Comment:
Bubbles appear to grow in the mouth for the carbonated ice product
Conclusions:
1. Carbonated ice - different character, slightly higher intensity than bottled.
2. Club soda Root Beer - different character, slightly higher intensity than bottled.
3. Physical measurements of $CO_2$ do not reflect the mouthfeel differences.

TABLE III

| COLA FLAVORED CARBONATED BEVERAGE | | | |
|---|---|---|---|
| Carbonation Notes | Bottled | Carbonated Ice | Club Soda + Cola Syrup |
| Prickly | 10 | 8 | 9 |
| Bubble amount | 11 | 9 | 10 |
| Bubble size | small–med | med–large | medium |
| Foamy | 0 | 9 | 3 |
| Total carbonation mouthfeel | 11 | 11 | 10 |
| $CO_2$ volume | 3.3 | 3.4 | 3.1 |

Comment: Bubbles appear to grow in the mouth for the carbonated ice product
Conclusions:
1. Carbonated ice - different character, similar intensity to bottled.
2. Bottled and club soda cola carbonated beverage similar to each other.
3. Physical measurements of $CO_2$ do not reflect the mouthfeel differences.

In general, the panelists found that the carbonation from the carbonated ice was of a pleasant but different character than from the other types of carbonation evaluated. The sensory perception was that the bubbles were larger than for other carbonation types. The carbonation from the carbonated ice compared favorably with both the bottled product and the club soda beverage and in one instance, the cola beverage was higher than both. In summary, carbonated beverages prepared by the process of the subject invention are substantially the same as the commercial product available in supermarkets or the beverage prepared in a soda fountain.

EXAMPLE 4

A series of eight runs was made utilizing the apparatus and procedure of Example 1 to prepare carbonated liquids from carbonated ice and dry ice. In the first four runs, the liquid was a cola beverage and in the last four it was spring water. The source of carbonation, carbonated ice or dry ice, was immersed in the liquid by inverting the apparatus in Runs 1, 2, 5 and 6 while in the remaining runs (Runs 3, 4, 7 and 8), the carbonated ice or dry ice was not immersed, the apparatus remained in an upright position.

The carbonated liquid in each run was sampled at the end of 10, 30 and 60 minutes of carbonation and analyzed for volume of carbonation by the Terriss cup method. The results are presented in Table IV.

TABLE IV

| | COLA | | | SPRING WATER | | |
|---|---|---|---|---|---|---|
| | Time, Min. | Terriss Cup Reading | Final Bev. Temp., °F. | Time, Min. | Terriss Cup Reading | Final Bev. Temp., °F. |
| | RUN 1 | | | RUN 5 | | |
| Carbonated Ice, Immersed | 10 | 3.25 | 56 | 10 | 3.7 | 53 |
| | | 3.15 | 55 | | 3.6 | 53 |
| | 30 | 3.1 | 58 | 30 | 3.25 | 53 |
| | | 3.1 | 59 | | 3.1 | 54 |
| | 60 | 2.9 | 57 | 60 | 2.6 | 58 |
| | | 2.65 | 57 | | 2.6 | 58 |
| | RUN 2 | | | RUN 6 | | |
| Dry Ice, Immersed | 10 | 2.7 | 51 | 10 | 2.5 | 51 |
| | | 2.65 | 51 | | 2.7 | 50 |
| | 30 | 2.55 | 52 | 30 | 2.4 | 58 |
| | | 2.7 | 52 | | 2.55 | 57 |
| | 60 | 2.45 | 62 | 60 | 2.3 | 64 |
| | | 2.55 | 62 | | 2.25 | 63 |
| | RUN 3 | | | RUN 7 | | |
| Carbonated Ice, Unimmersed | 10 | 1.35 | 65 | 10 | 1.9 | 62 |
| | | 1.35 | 63 | | 1.95 | 62 |
| | 30 | 1.5 | 66 | 30 | 2.55 | 57 |
| | | 1.5 | 67 | | 2.45 | 58 |
| | 60 | 2.1 | 62 | 60 | 2.45 | 61 |
| | | 2.1 | 62 | | 2.3 | 61 |
| | RUN 4 | | | RUN 8 | | |
| Dry, Ice, Unimmersed | 10 | 1.25 | 61 | 10 | 1.28 | 63 |
| | | 1.25 | 61 | | 1.6 | 62 |
| | 30 | 1.75 | 60 | 30 | 1.6 | 64 |
| | | 1.8 | 60 | | 1.85 | 63 |
| | 60 | 2.1 | 65 | 60 | 1.55 | 64 |
| | | 2.0 | 64 | | 2.0 | 65 |

This series of tests showed that carbonated ice produced a higher degree of carbonation than dry ice in both the cola beverage and spring water. In addition, immersion of the carbonated ice produced an even higher volume of carbonation.

The relative carbonation levels produced by carbonated ice, dry ice and a carbon dioxide cartridge were evaluated. A cola beverage and spring water were carbonated, with two trials being made for each combination of beverage and carbonation source. The procedure and apparatus of Example 1 were used for the carbonated ice and the dry ice and in each instance the immersion technique was employed. A commercially-available carbonation bottle utilizing a CO2 cartridge system was employed to evaluate the carbonation level produced by a CO2 cartridge. The average of the Terriss cup values for volume of carbonation for each two trials sampled after the elapse of ten minutes are set forth below.

| | Carbonated Ice | Dry Ice | $CO_2$ Cartridge |
|---|---|---|---|
| Cola | 3.200 | 2.675 | 2.838 |
| Spring Water | 3.650 | 2.600 | 2.700 |

This shows that the immersion of carbonated ice in a closed vessel produces a greater volume of carbonation than an equal amount of $CO_2$ as either dry ice or a carbon dioxide cartridge.

The above series of examples shows that in side-by-side tests with other point of consumption carbonation systems, the process of immersing carbonated ice in an aqueous liquid in a closed system surprisingly produces a carbonated beverage having a significantly higher degree of carbonation.

What is claimed is:

1. A method of carbonating water which comprises contacting water with carbonated ice initially at substantially normal atmospheric pressure in a closed pressure vessel, the carbonated ice containing at least 25 ml of carbon dioxide per gram of ice, the amount of carbonated ice being sufficient to create a superatmospheric pressure in said vessel and provide carbonated water containing at least three volumes of carbon dioxide.

2. A method according to claim 1 wherein the water contains sweetener and flavor and the carbonated water is a carbonated beverage.

3. A method according to claim 1 wherein said contacting is accomplished by the steps of:
   (a) adding water to said vessel while retaining a head space;
   (b) inserting said carbonated ice into said head space out of contact with the water;
   (c) closing said vessel to the atmosphere; and
   (d) altering the position of the closed pressure vessel so that the water contacts the carbonated ice.

4. A method according to claim 3 wherein the head space comprises up to about 50 volume percent of the total internal volume, and the amount of carbonated ice produces, at the completion of the carbonation process, a pressure of about 10-120 psig in said head space and a carbonated liquid having a carbonation volume greater than 3.

5. A method according to claim 1 wherein the carbonated ice contains 25-118 ml. of carbon dioxide per gram of ice.

6. A method according to claim 5 wherein the carbonated ice contains about 35 to about 90 ml. of carbon dioxide per gram of ice.

7. A method according to claim 1 wherein said contacting is accomplished by the steps of:
   (a) adding water to said vessel while retaining a head space;
   (b) inserting said carbonated ice into said vessel so that said carbonated ice is in contact with the water;
   (c) closing said vessel to the atmosphere; and
   (d) altering the position of the closed pressure vessel so that the carbonated ice is entirely retained beneath the surface of the water.

8. A method according to claim 1 wherein said contacting is accomplished by the steps of:
   (a) adding water to said vessel while retaining a head space;
   (b) inserting said carbonated ice into said vessel so that said carbonated ice is out of contact with the water;
   (c) closing said vessel to the atmosphere; and
   (d) altering the position of the closed pressure vessel so that the carbonated ice is entirely retained beneath the surface of the water.

* * * * *